United States Patent

Kobayashi et al.

[11] Patent Number: 5,936,528
[45] Date of Patent: Aug. 10, 1999

[54] VISUALLY HANDICAPPED PERSON GUIDANCE AND SUPPORT

[75] Inventors: Masamitsu Kobayashi, Chofu; Tuguo Kubota, Miyakonojo, both of Japan

[73] Assignees: Sunny Sealing Co., Ltd.; Sensor Technos Co., Ltd., both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,796

[22] Filed: Apr. 8, 1997

[30] Foreign Application Priority Data

May 20, 1996 [JP] Japan ..................................... 8-162266

[51] Int. Cl.$^6$ ..................................................... G08B 13/14
[52] U.S. Cl. ..................................... 340/572.5; 340/573.1; 340/693.8; 340/825.19; 340/825.54; 340/825.49
[58] Field of Search ........................ 340/825.19, 825.54, 340/825.36, 825.49, 572, 573, 539, 693; 342/24

[56] References Cited

U.S. PATENT DOCUMENTS

| | | | |
|---|---|---|---|
| 4,025,922 | 5/1977 | Trawick, III | 340/539 |
| 4,598,276 | 7/1986 | Tait | 340/572 |
| 4,656,463 | 4/1987 | Anders et al. | 340/572 |
| 4,745,401 | 5/1988 | Montean | 340/572 |
| 4,973,952 | 11/1990 | Malec et al. | 340/825.35 |
| 5,144,294 | 9/1992 | Alonzi et al. | 340/825.49 |
| 5,508,699 | 4/1996 | Silverman | 340/539 |
| 5,548,291 | 8/1996 | Meier et al. | 340/825.54 |

*Primary Examiner*—Thomas Mullen
*Assistant Examiner*—Sihong Huang
*Attorney, Agent, or Firm*—Fattibene & Fattibene; Paul A. Fattibene; Arthur T. Fattibene

[57] ABSTRACT

A visually handicapped person guidance and support apparatus comprises a resonance tag, antenna and portable scanner. The resonance tag has an inductance element defined by a pair of conductive foil and a capacitance element coupled in distributed capacity to the conductive foil through a dielectric thin film. The visually handicapped person scans the resonance tag with a stick containing the antenna coupled to the portable scanner. The antenna transmits electric waves having the frequency of 5 to 60 MHz and predetermined resonance electric waves are reflected from the resonance tag. The received resonance waves are collated with the memory data by the scanner 3 and converted to voice message for output from a speaker. If a plurality of resonance tags, each of which has a different resonance frequency, are used, a plurality of information such as "go", "stop", "turn to right", "turn to left" and the like are obtained.

3 Claims, 7 Drawing Sheets

VISUALLY HANDICAPPED PERSON GUIDANCE AND SUPPORT

BACKGROUND OF THE INVENTION

1. Field of the Invention

This invention relates to a visually handicapped person guide and support system and apparatus both of which use resonance labels (commonly named resonance tags).

2. Description of the Related Art

Conventionally, several kinds of visually handicapped person guide system are known. For example, a system disclosed in Japanese Published Unexamined Patent Application 204237/74 has a following composition. An inducing coil which generates an alternating current magnetic field due to previous excitation caused by a transmitter and an output device which gives an indication of guidance are buried at a dangerous point. Then, when a visually handicapped person, who carries a sensor manufactured with a material generating alternating current magnetic field due to its high magnetic permeability, approaches to the dangerous point, inductance of the inducing coil is changed and this change is detected. Thus, the output device such as a sounding device gives an notice to the person that this point is dangerous.

However, in a conventional system of this kind, the transmitter by which the inducing coil generates the alternating current magnetic field, an electronic circuit by which the inductance change of inducing coil is detected, and the output device by which the indication of guidance is given are necessary in very dangerous point, resulting in high cost. Additionally, if the system is loaded in an existing structure or provided temporarily, e.g. in an exhibition hall which is open for a short period, construction for loading the system is complicated and difficult, which causes a problem. Moreover, by utilizing this conventional system, given information output is only one kind; changing of inductance of inducing coil. Accordingly, at a point where two or more than two kinds of information output are required, the number of kinds of inducing coil and output device should be the same as those of information output.

In application, if the visually handicapped person stays at one position for long time, notice from the output device, e.g. voice message from the sounding device is repeated many times. Such situation is apt to scare the visually handicapped person. Further, if the dangerous point is located among many buildings, since the voice from the sounding device makes an echo, the visually handicapped person can not understand its voice source. In this case, although the guidance system is used, mental complication of the visually handicapped person is increased on the contrary.

SUMMARY OF THE INVENTION

The present invention is attained based on consideration for solving the above mentioned problems and has an object to provide a visually handicapped person guide and support system and apparatus, which can be loaded in simple construction, which is cheap, which enables smooth and safe guidance and support for the visually handicapped person, and which can supply various kinds of information easily.

For attaining this object, in accordance with the present invention, a visually handicapped person guidance and support system comprises resonance means which is loaded in any place where a visually handicapped person should be guided and which is provided with an LC resonance circuit oscillating echo waves due to induction resonance caused by electric waves with predetermined frequency; transmitting means which transmits electric waves having optimal frequency band to the resonance means; receiving means which receives the echo waves with predetermined frequency oscillated from the resonance means; and guidance information output means which outputs guidance information according to the echo waves with the predetermined frequency received by the receiving means.

In another aspect of the present invention, the visually handicapped person guidance and support apparatus comprises resonance means which is loaded in any place where a visually handicapped person should be guided and which is provided with an LC resonance circuit oscillating echo waves due to induction resonance caused by electric waves with predetermined frequency; an antenna which transmits electric waves having optimal frequency band to the resonance means and which receives the echo waves with the predetermined frequency oscillated from the resonance means; and a portable scanner which outputs guidance information according to the echo waves with the predetermined frequency received by the antenna.

The resonance means is defined by resonance label which comprising a pair of spiral wound conductive foils as inductance elements and dielectric as a capacitance element. The resonance label is provided with a pair of spiral wound conductive foils which have the same spiral direction, laminated on opposite surface of dielectric; so that the pair of spiral wound conductive foils coupled with distributed capacitance through the dielectric.

The above mentioned resonance means may be composed of plurality of resonance labels having different kinds of frequency according to the plurality of guidance information. The resonance means may be provided in a passage, stair, aisle floor, wall surface, or Braille block. The point, on which the resonance means is loaded, may be covered with a protection tape or synthetic resin coating film. The antenna may be attached to the tip end of stick, tip end of pencil type bar, bottom of shoe, and the like. The portable scanner may be configured so as to output alarm sound or voice message in language of a desired country, alternatively, the portable scanner may be provided with vibration output function for alarming.

In the visually handicapped person guidance and support system and apparatus in accordance with the present invention, to the resonance means which is loaded in the place where the visually handicapped person should be guided, the electric waves having the predetermined frequency are transmitted, through the means of antenna attached to the tip end of stick, tip end of pencil type bar, bottom of shoe, and the like. Thus, the resonance label serving as the resonance means oscillates the echo waves due to the induction resonance caused by the electric waves with the predetermined frequency in the region of optimal frequency band transmitted from the antenna. Then, the echo waves oscillated from the resonance label are received by the antenna. The resultant electric wave signal is converted to the guidance information output by means of portable scanner for giving information to the visually handicapped person.

DESCRIPTION OF THE PREFERRED EMBODIMENTS

Figure 1:
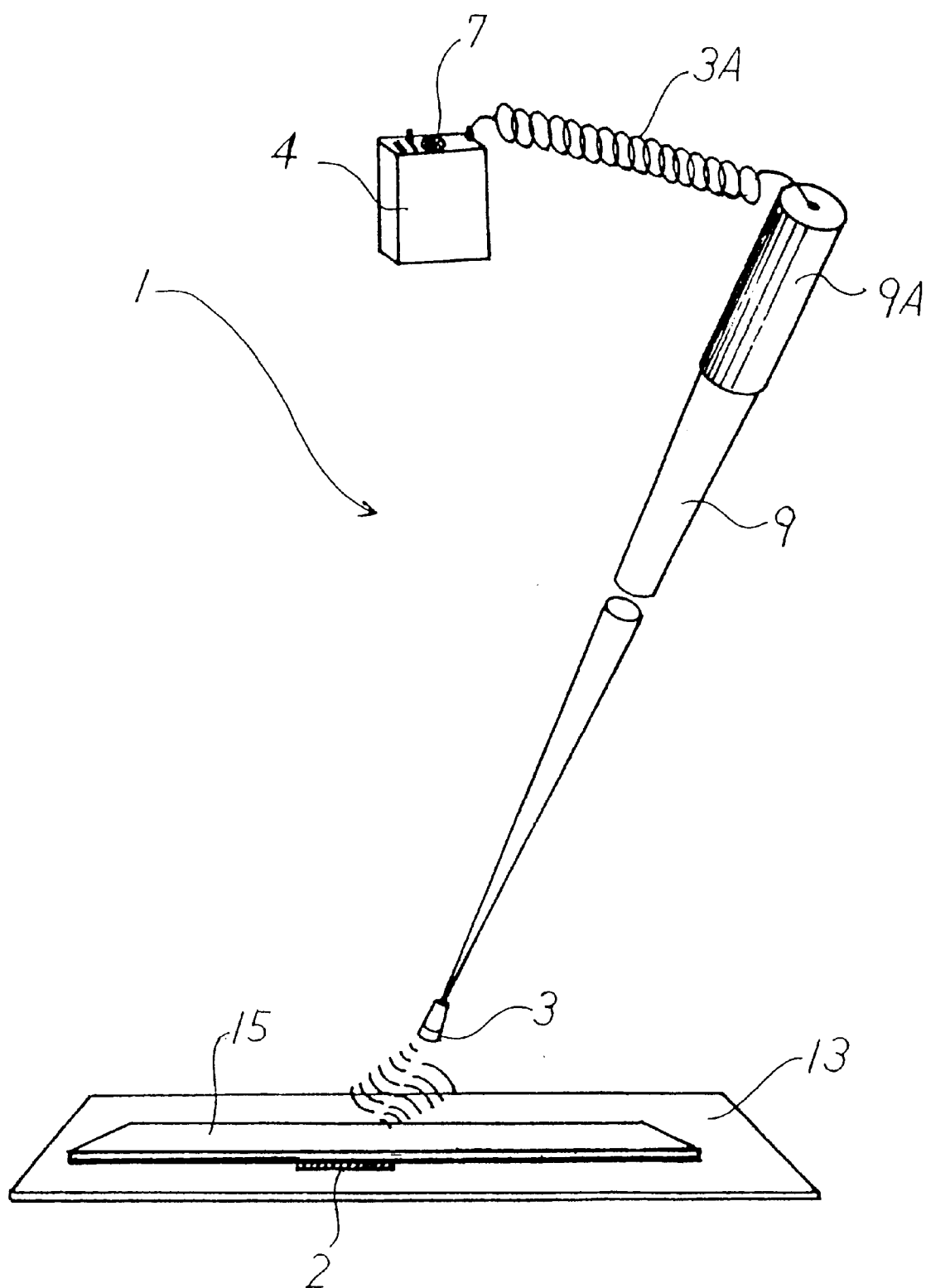
FIG. 1 is an illustration showing schematically the operation of the visually handicapped person guidance and support apparatus in accordance with the present invention.
Figure 7:
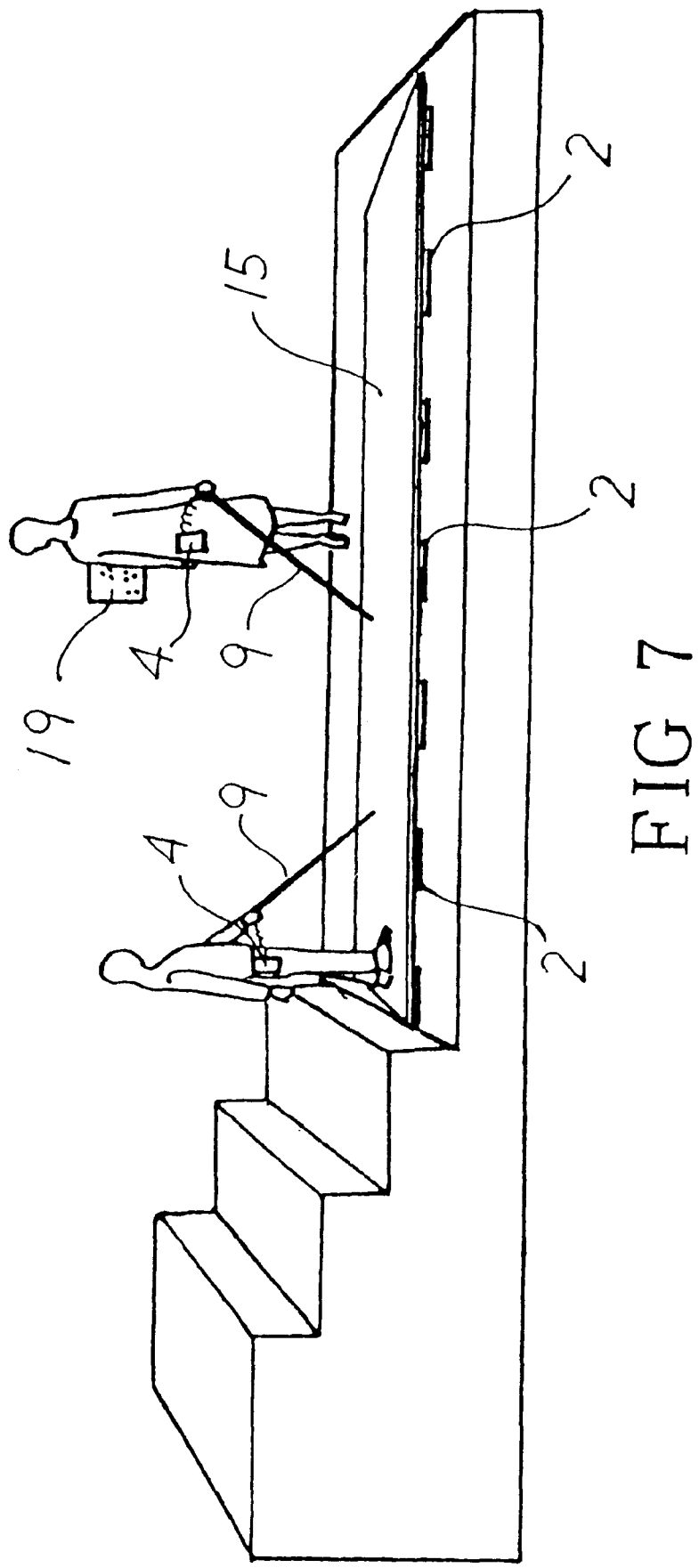
FIG. 7 is an illustration showing schematically one example of application of the visually handicapped person guidance and support apparatus in accordance with the present invention.

Now, embodiments of the present invention are explained referring to the drawings. As shown in FIG. 7, a visually handicapped person guidance and support apparatus 1 is loaded in any place where the visually handicapped person should be guided. For example, the apparatus is provided so as to be stuck in a passage, stair, aisle floor, wall surface, or Braille block. Then, as shown in FIG. 1, the apparatus comprises a resonance label 2 which is provided with an LC resonance circuit oscillating echo waves due to induction resonance caused by electric waves with predetermined frequency; an antenna 3 which transmits electric waves having optimal frequency band to the resonance label 2 and which receives the echo waves oscillated from the resonance label 2; and a portable scanner 4 which outputs guidance information according to the echo waves with the predetermined frequency received by the antenna 3. The portable scanner 4 is coupled electrically to the antenna 3 and comprises a transmitting and receiving circuit 5 which transmits and receives electric wave having the frequency band of 5 to 60 MHz; a detecting circuit 6 which, has a data memory; and an outputting circuit 8 which is equipped with a speaker 7 and which can be adjusted in volume.

The antenna 3 is, as shown in FIG. 1, configured so that it can be attached to the tip end of stick 9 removably for replacing, and that it has function of moisture-proof. The detection range of the antenna 3 is determined so as to have the distance, from the center of the resonance label 2, for example of about 10 to 15 cm in the vertical direction and about 3 to 5 cm in the horizontal direction. The portable scanner 4 is coupled to the antenna 3 through the means of a curl code 3A which is inserted through the antenna 3 from a handle 9A of the stick 9 with electrical continuity and which has an attachment plug. The antenna 3 is preferably attached to the tip end of the stick 9 carried by the visually handicapped person. However, if the resonance label 2 is stuck to the wall surface, the antenna 3 may be attached to the pencil type bar. Alternatively, the resonance label 2 may be provided on the bottom of shoe. The portable scanner 4 is configured so as to output alarm sound or voice message in language of a desired country. The guidance information in the form of alarm sound or voice message is given to the visually handicapped person through the speaker 7 or ear phone (not shown). If the apparatus is loaded in noisy environment, the guidance information from the portable scanner 4 may be given in the form of vibration output. Additionally, in the range of frequency band of electric waves, the resonance labels 2, each of which is distinguished due to each predetermined resonance frequency, may be loaded. In this case, the visually handicapped person can receive at most 14 kinds of message such as "go", "turn to the right", "turn to the left", "upstairs", "downstairs" and the like.

Figure 4:
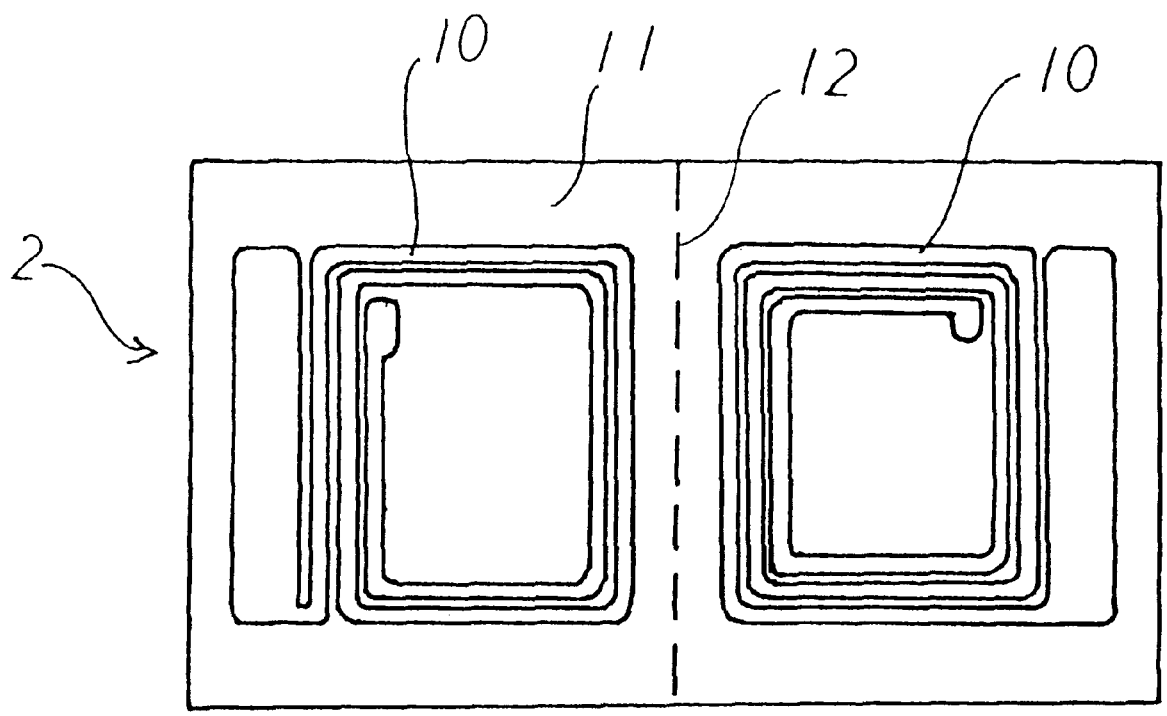
FIG. 4 is a development showing one example of resonance label used in the visually handicapped person guidance and support apparatus in accordance with the present invention.

The resonance label 2 comprises an inductance element which is fabricated with spiral wound conductive foil and a capacitance element which is formed by a dielectric fixed to at least part of the inductance element. The resonance label 2 has a laminated circuit unit which is provided with a pair of spiral wound conductive foil formed on the opposite surfaces of the dielectric. In the resonance label 2, there are a pair of spiral wound patterns. The patterns are overlapped while they have the same spiral direction when they are opposed through the pair of spiral wound conductive foil so that the spiral wound pattern formed on the spiral wound conductive foil at one side is coupled in distributed capacity to the spiral wound pattern formed on the spiral wound conductive foil at the other side through the dielectric, for example at the ends of the spiral wound patterns. Concretely, as shown in FIG. 4, the resonance label 2 is configured so that the pair of spiral wound conductive foil 10, which is fabricated with aluminum foil having the thickness of about 20 to 30 $\mu$m and which defines the inductance element, are stuck to a polyester tape 11 having the thickness of more than about 50 $\mu$m as a pasteboard by means of releasable adhesive. A perforation line 12 is provided along the center line of the polyester tape 11 so that the pair of aluminum foils 10 are arranged laterally and symmetrically with respect to the perforation line 12. Additionally, a polyethylene thin film (not shown), which has the thickness of about 10 $\mu$m and which serves as the dielectric, is laminated on the aluminum foil 10 stuck to the polyester tape 11. Then, the polyester tape 11 is folded in two with respect to the perforation line 12 so that the pair of aluminum foil 10 can be overlapped oppositely through the polyethylene thin film, resulting in the capacitance element in distributed capacity. Thus, the LC resonance circuit unit requiring no electrical continuity can be formed.

Figure 5:
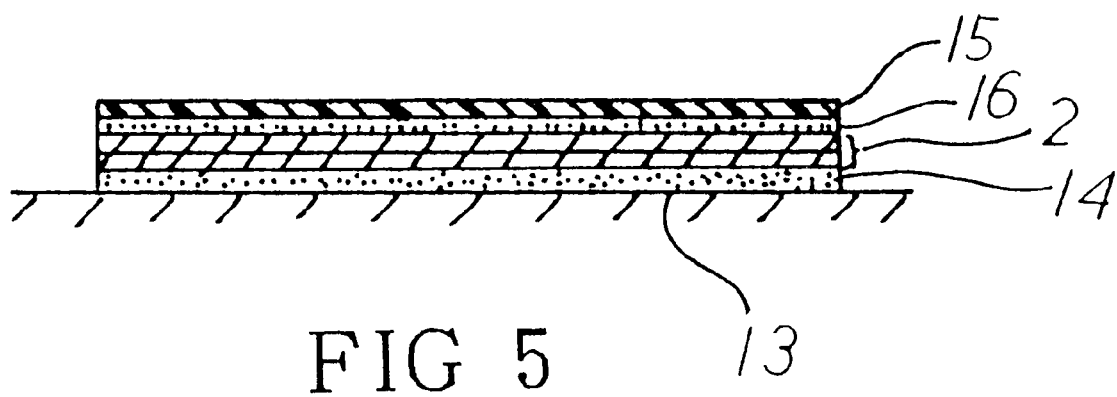
FIG. 5 is a cross section showing the resonance label of FIG. 4, where the label is stuck to the floor.
Figure 6:
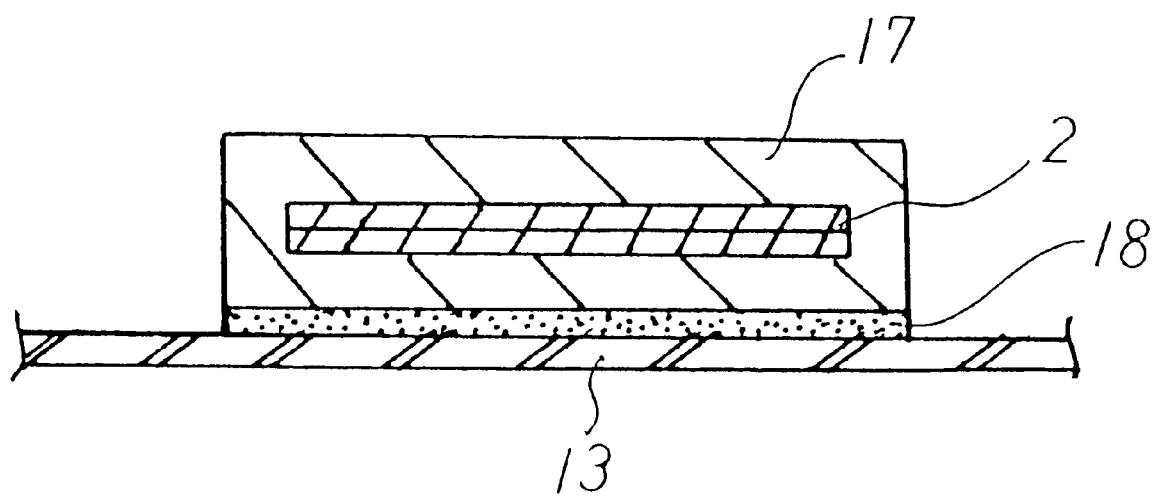
FIG. 6 is a cross section showing one example of resonance label used in the visually handicapped person guidance and support apparatus in accordance with the present invention where the label is buried in the Braille block.

The resonance frequency of the LC resonance circuit unit is determined by total number of turns of the spiral wound conductive foil serving as the inductance element and dielectric constant and thickness of the capacitance element provided between the pair of conductive foil. Accordingly, the number of turns of the spiral wound conductive foil should be changed such that the resonance circuit of the resonance label 2 can respond to desirable resonance frequency. For example, in order to give various kinds of message, a plurality of resonance circuits are provided in one resonance label 2, alternatively, a plurality of resonance labels 2 each of which has different resonance frequency are provided. Generally, as shown in FIG. 5, a plurality of resonance labels 2 each of which has the same or different resonance frequency, are stuck by means of epoxy adhesive 14 to the floor 13 and the like where the visually handicapped person should be guided. The plurality of resonance labels 2 are provided with spaces so that their echo waves are not interfered mutually. The upper surface of each resonance label 2 is coated with a protection tape 15 of vinyl chloride and the like by means of pressure sensitive adhesive 16. Alternatively, the resonance label 2 may be previously coated by the protection tape 15 before sticking to the floor 13 for easy handling and working. Instead of the protection tape 15, a synthetic resin coating film (not shown) may be used. As the pressure sensitive adhesive 16, acrylic adhesive containing mainly polyacrylic ester or rubber adhesive comprising tackifier and elastic body such as natural rubber, synthetic rubber, and the like are used. As shown in FIG. 6, single or a plurality of resonance label 2 is or may be buried in existing Braille block 17 and the block is stuck to the floor 13 by means of heat resisting releasable pressure sensitive adhesive 18 (commonly named prymer).

Figure 2:
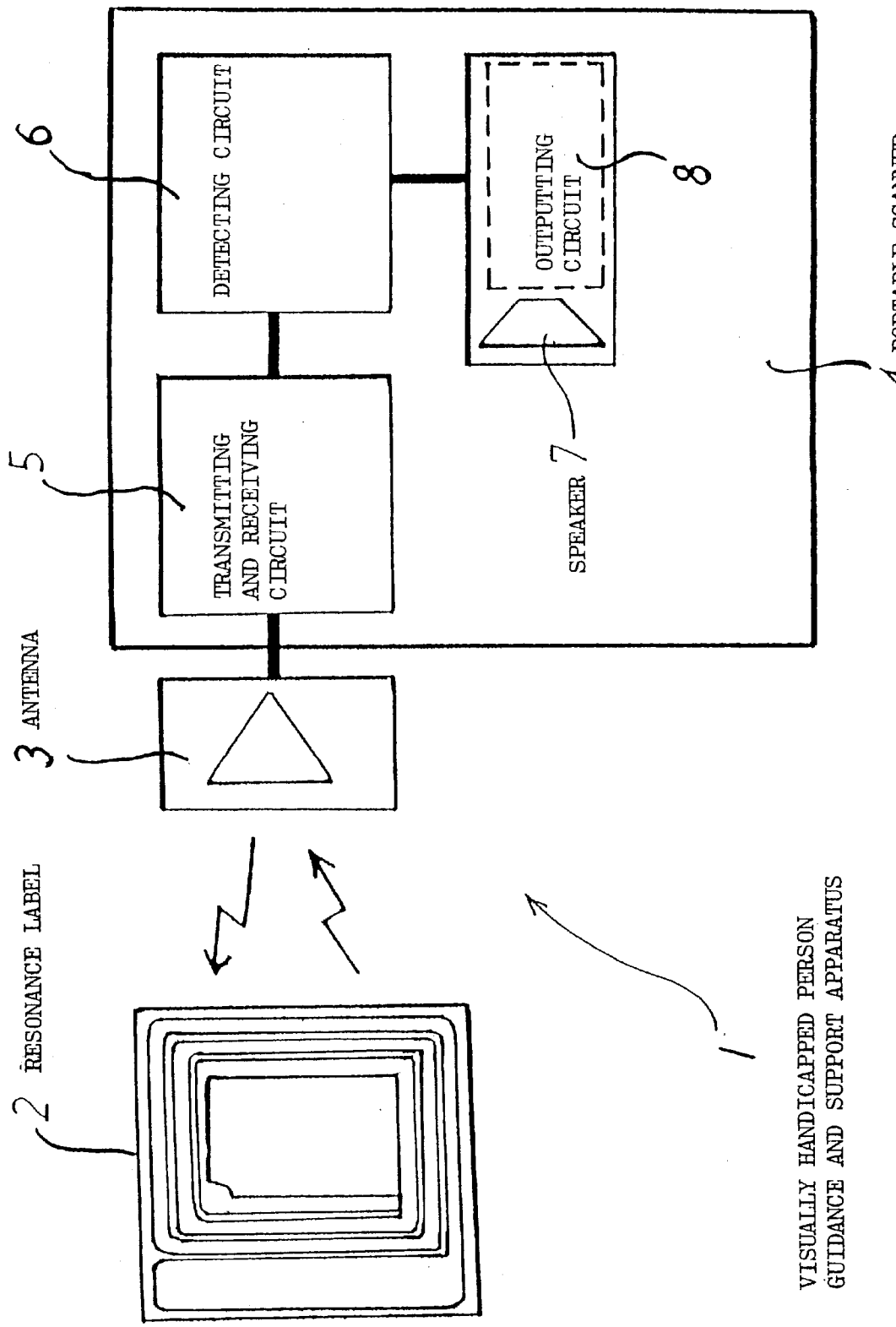
FIG. 2 is a block view showing general construction of the visually handicapped person guidance and support apparatus in accordance with the present invention.
Figure 3:
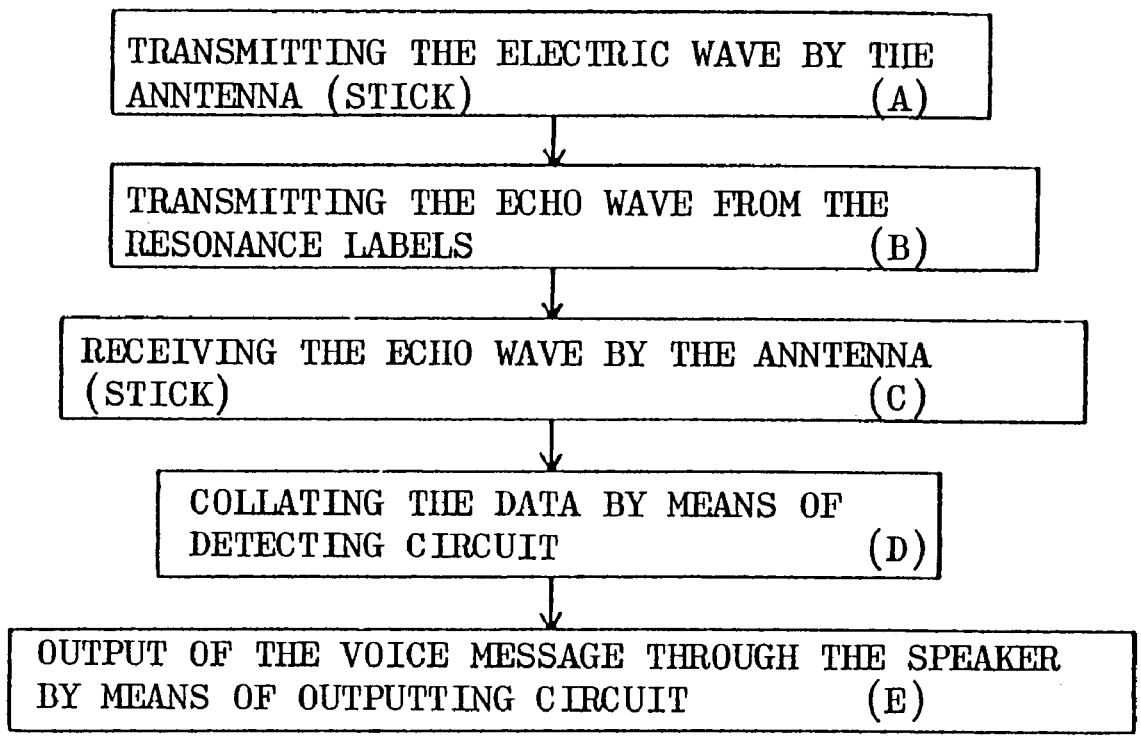
FIG. 3 is a flow chart showing the working of the visually handicapped person guidance and support apparatus in accordance with the present invention.

Now, one example of working of the visually handicapped person guidance and support system and apparatus is explained referring to the circuit diagram of FIG. 2 and flowchart of FIG. 3. First, the visually handicapped person, as shown in FIG. 7, confirms the point he or she is going to by means of Braille block 17. Then, he or she uses the stick 9 which contains the antenna 3 coupled to the portable scanner 4 for scanning the resonance label 2 over the protection tape 15 or synthetic resin coating film (not shown). (A) The transmitting and receiving circuit 5 in the portable scanner 4 transmits the electric waves having the frequency band of 5 to 60 MHz through the antenna 3 contained in the stick 9. (B) The resonance label 2 transmits the echo waves having the predetermined frequency due to resonance caused by the electric waves. In this case, if a plurality of resonance labels 2 each of which has different resonance frequency are used, the resonance labels 2 return different kinds of echo wave, respectively. (C) The echo wave is received by the transmitting and receiving circuit 5 in the portable scanner 4 through the means of antenna 3 contained in the stick 9. (D) The received echo waves are collated with a plurality of data, which was previously stored in memory, by means of detecting circuit 6. (E) According to this collating, data corresponding to the received echo wave is selected. The selected data is, by means of outputting circuit 8, converted to the voice message which is given as information output through the speaker 7. Thus, the visually handicapped person can be guided by utilizing information.

The visually handicapped person guidance and support system in accordance with the above mentioned present invention has the following effects. This system naturally can be applied in the floor of passages, stairs and walls in each building. Additionally, this system can be applied extensively in a park, public facilities, temporary exhibition hall, platform of station and the like. By utilizing this system, the visually handicapped person can be guided smoothly and safely. Although in each conventional system, a specific power source, transmitter, output apparatus (speaker) and the like have been required, in the present invention, it is unnecessary that they are buried and worked, because of resonance label No matter what shape the place has, this system can be used by only sticking to it. This system can be configured at low cost. Further, various kinds of information can be supplied easily. After the system is used, it can be easily released and removed.

What is claimed is:

1. A visually handicapped person guidance and support system comprising:
   a plurality of passive laminated resonance circuits, each of said plurality of passive laminated resonance circuits having spiral wound conductive foil formed on opposite surfaces of a dielectric and a different predetermined resonance frequency, said plurality of passive laminated resonance circuits being placed in an area traveled by the visually handicapped person;
   a transmitter carried by the visually handicapped person, said transmitter transmitting an optimal frequency band causing each of said plurality of passive laminated resonance circuits to resonate when the optimal frequency band is received;
   a receiver, said receiver receiving the predetermined different resonance frequency of each of said plurality of passive laminated resonance circuits; and
   an output device providing a different message to the visually handicapped person depending upon the different resonance frequency received by said receiver, each of the different messages providing directional and related guidance information to the visually handicapped person,
      whereby said plurality of passive laminated resonance circuits require no stored or additional power source other than electromagnetic energy provided substantially contemporaneously by said transmitter to produce an echo wave to be received by said receiver.

2. A visually handicapped person guidance and support system as in claim 1 wherein:
   each of said spiral wound conductive foils are wound in the same spiral direction.

3. A visually handicapped person guidance and support system comprising:
   a plurality of passive laminated resonance circuits, each of said plurality of passive laminated resonance circuits having spiral wound conductive foil formed on opposite surfaces of a dielectric and a different predetermined resonance frequency, said plurality of passive laminated resonance circuits being placed in an area traveled by the visually handicapped person;
   a transmitter carried by the visually handicapped person, said transmitter transmitting an optimal frequency band of five to sixty Mhz causing each of said plurality of passive laminated resonance circuits to resonate when the optimal frequency band is received;
   an antenna, said antenna attached to a shoe of the visually handicapped person and having a directional range of ten to fifteen centimeters in a vertical direction and three to five centimeters in a horizontal direction and receiving the predetermined different resonance frequency of each of said plurality of passive laminated resonance circuits;
   a portable scanner coupled to said antenna, said portable scanner storing a plurality of different messages, each of the plurality of different messages providing directional and related guidance information to the visually handicapped person, and said portable scanner providing one of the plurality of different messages to the visually handicapped person depending upon the different resonance frequency received by said antenna,
      whereby said plurality of passive laminated resonance circuits require no additional power source other than electromagnetic energy provided by said transmitter to produce an echo wave to be received by said antenna and the visually handicapped person may be guided by the plurality of different messages.

* * * * *